United States Patent [19]

Magerle

[11] 3,751,189
[45] Aug. 7, 1973

[54] DEVICE FOR CLOSING A MOULD CAVITY
[75] Inventor: Karl Magerle, Kusnacht, Switzerland
[73] Assignee: Tubmatic Inter AG, Zug, Switzerland
[22] Filed: Aug. 17, 1971
[21] Appl. No.: 172,500

[30] Foreign Application Priority Data
Aug. 21, 1970 Switzerland.................... 12520

[52] U.S. Cl................. 425/258, 425/193, 425/288, 425/410
[51] Int. Cl............................................ B29h 5/02
[58] Field of Search................. 425/256, 258, 287, 425/288, 193, 410, 412, 419

[56] References Cited
UNITED STATES PATENTS
2,120,943 6/1938 Schutz........................... 425/256 X
2,246,759 6/1941 Roth et al...................... 425/288 X Primary Examiner—H. A. Kilby, Jr.
Attorney—Cushman, Darby & Cushman

[57] ABSTRACT

A device for closing a mould cavity having an aperture leading into the hollow space of the cavity, said device comprising at least one mandrel which can be introduced into the hollow space of the cavity from the opposite side of the aperture, a slide allocated to the mould cavity and capable of being moved at right angles to the mandrel and which in one terminal position blocks off the aperture into the hollow space of the cavity, a punching die which passes through the aperture when the hollow space of the cavity is closed, said punching die being arranged on the side of the slide in relation to the mould cavity and movable both transversely and parallel in relation to the longitudinal axis of the mandrel.

21 Claims, 6 Drawing Figures

3,751,189

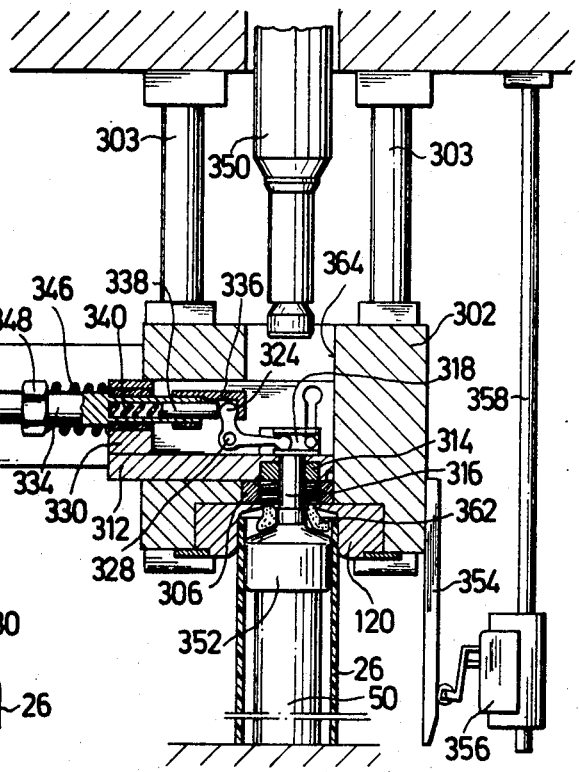
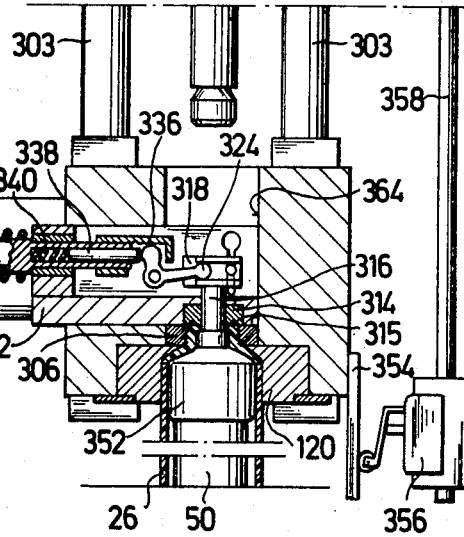
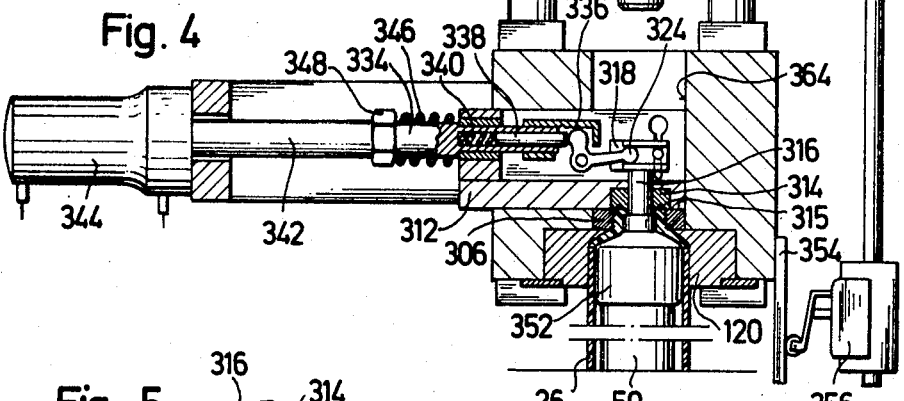
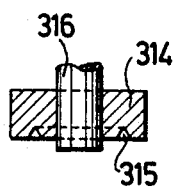
Fig. 3
Fig. 6
Fig. 4
Fig. 5

DEVICE FOR CLOSING A MOULD CAVITY

The present invention relates to a device for closing a mould cavity.

In the production of hollow bodies made of plastic, for example tubes or bottles, it is oftem necessary already when moulding the body or a part of it, such as for example the head of the tube, to provide an aperture which leads into the hollow body and which in the finished article forms the outlet for the product with which it is filled.

In those cases in which the mould consists of two main parts, namely a cavity and a mandrel — in which the latter, for example, carries a prefabricated pipe for the tube and when the mould is closed introduces one end of this tube pipe into the cavity — it is usual to provide the mandrel at its free end with an extension forming a punching die which passes through the cavity.

In this case there is the disadvantage that the punching die and the cavity hole co-operating with it are subjected to wear, because on the one hand the engagement of the punching die in the cavity hole has to be effected without play and on the other hand the centring of the mandrel in relation to the cavity cannot be achieved in practice, so that the punching die when introduced into the cavity hole, that is to say during the closure movement of the parts of the mould, is worn away by friction. During the moulding of the head section, plastic penetrates into the gap between the punching die and the cavity hole resulting from the wear, so that a characteristic flaw is formed on the moulded plastic article.

A further difficulty with punching dies fitted on to the mandrels arises from the fact that that part of the cavity in which the punching die has to engage has to be designed in many cases as a slide which can move transversely in relation to the axis of the mandrel and the punching die. In order for it to be possible for plasticised plastic to be introduced into the cavity, this requires an aperture on the side opposite the mandrel aperture. After the plastic has been introduced, this aperture must be closed. During operation it therefore happens that the slide which closes the aperture, which now in turn contains the whole for taking the end of the punching die (in relation to the closure movement between the mandrel and the cavity) does not reach the closure position at the right time or leaves it too early, as a result of which the punching die is damaged or destroyed.

The present invention is now aimed at providing a device which makes it possible to avoid these drawbacks.

The device according to the invention, with an aperture leading into the hollow space of the cavity, at least one mandrel which can be introduced into the cavity space from the opposite side of the aperture, a slide allocated to the mould cavity and capable of moving at right angles to the mandrel, which in one terminal position cuts off the aperture into the hollow space of the cavity, and also a punching die which passes through the aperture when the hollow space of the cavity is closed, is characterised by the fact that the punching die is arranged on the side of slide in relation to the mould cavity and is capable of moving transversely and parallel in relation to the longitudinal axis of the mandrel.

The arrangement of the punching die on the side of the slide, that is to say the allocation of same to the cavity, provides the important advantage, as compared with previous arrangemens, that only one single punching die has to be provided for each moulding position, whilst hitherto each of the mandrels which co-operates successively with the moulding position had to have a punching die. This means not only that one can shorten the conversion time for the machine if it should become necessary to use a punching die with different dimensions, but it also means a simplification by virtue of the fact that only one punching die has to be kept available for each dimension and moulding position.

Furthermore it is important that there is no longer a connection between the function of the punching die and the centring of the mandrels in relation to the cavity, as a result of which the reliability of the machine is increased and rejects resulting from excessive wear can be avoided.

All these advantages can also be achieved if the plastic is intorduced by means of a nozzle type unit which dips into the hollow space of the mould through the aperture of the cavity, as is the case with one known pressing process. As the punching die releases the aperture not only by an axial movement but also by a transverse movement, it is possible for the unit which introduces the plastic to move only in an axial path.

An example of execution of the device according to the invention for closing a mould cavity is shown by way of example in the drawing.

FIGS. 3 and 4 show sections corresponding to FIG. 1 but with the parts of the device in different positions;

FIG. 5 shows a detail of the device in an axial section and on an enlarged scale, and FIG. 6 shows the top of a finished tube in cross-section on a scale corresponding to FIG. 5.

Figure 1:
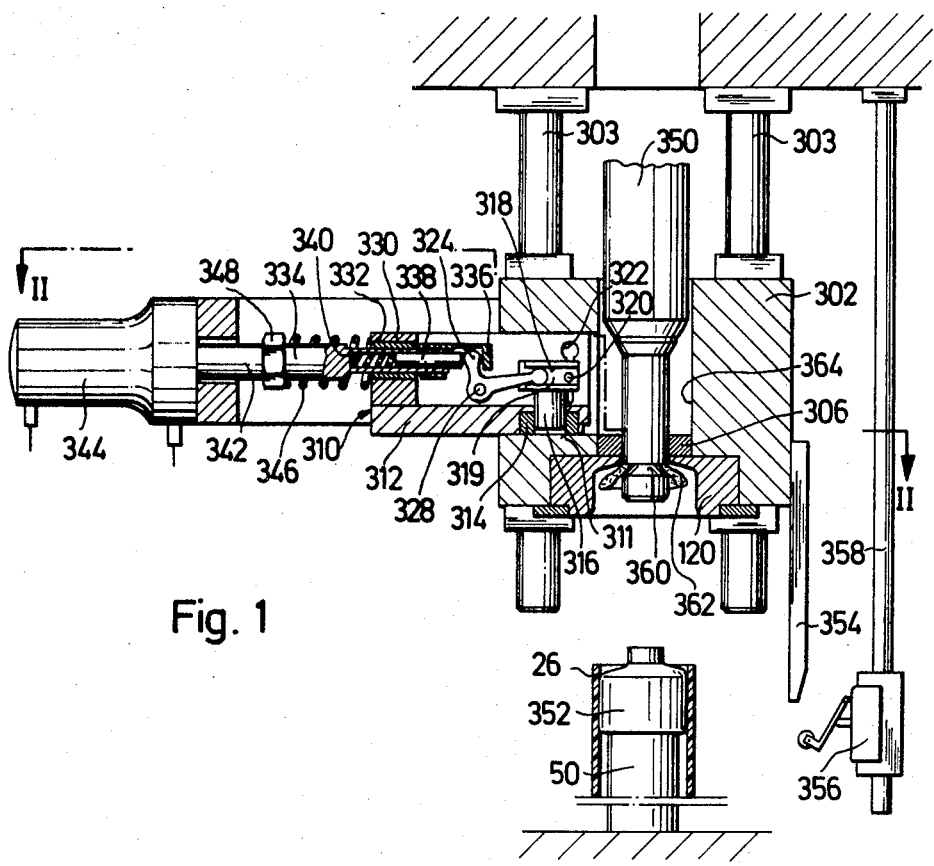
FIG. 1 shows the device in a vertical section along the line I — I in FIG. 2.

The device described below and represented in the drawing is described in conjunction with a machine for the production of collapsible tubes in plastic, in which head pieces are welded on to prefabricated tube sections for the collapsible tubes, which are produced in the pressing process from molten plastic in the same operation. Such a machine is described, for example, in U.S. Pat. No. 3,313,875.

Figure 2:
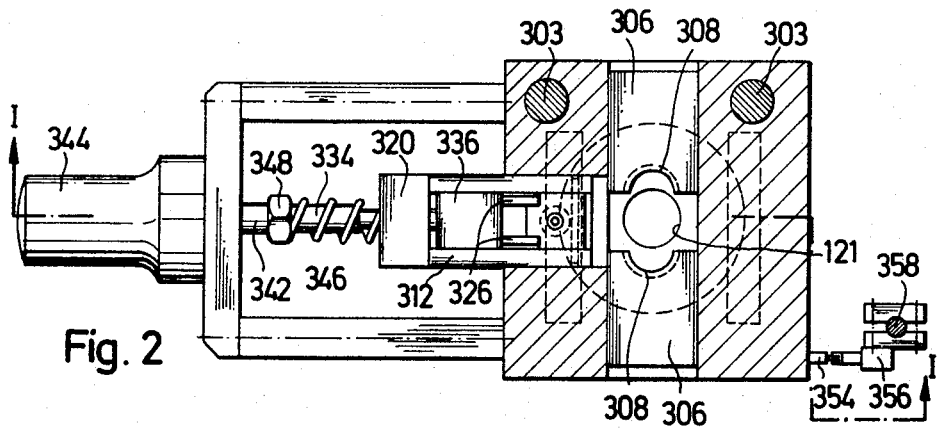
FIG. 2 shows a horizontal section along the line II — II in FIG. 1.

In a machine of this kind mandrels are provided which are arranged uniformly distributed around the circumference of a turntable. By rotating the turntable step by step these mandrels are brought successively into a position in which they are aligned in an axial direction to a moulding station which contains the device. As can be seen from FIGS. 1, 3 and 4, a toolholder 302 is mounted in two rigid columns 303 so that it can be moved vertically against the turntable 40. In the toolholder 302 there is fixed a cavity 120 in a manner which is not shown in greater detail. Immediately above the cavity 120 there are mounted two split followers 306 so that they can move horizontally in opposite directions between an open position (FIG. 12) and a closed position, the split followers being actuated by a hydraulic cylinder which is not shown in the drawing. In the example illustrated each of these split followers 306 has a threaded half 308 (FIG. 2). Over the split followers 306 there is mounted a slide 310 so that it can be moved horizontally in a guide groove 311 in the toolholder 302.

The slide 310 consists of a slide casing 312 in which an annular insert 314 is fixed.

A punching die 316 is arranged so that it can be moved vertically in the hole of the insert 314. The punching die is screwed at its top end to a groove block 218 which is provided with grooves 319 running horizontally and arranged at the side. A pin 320 is fixed to the groove block 318 and engages at both ends in guide grooves 322 provided in the slide casing 312.

A rocker 324 engages with two fork-shaped arms 326 (FIGS. 1 and 2) into the lateral grooves 319 of the groove block 318. The rocker 324 is mounted on a pin 328 in the slide casing 312 so that it can swivel. In a bearing block 330 there is a bush 332 in which a rod 334 is mounted so that it can be moved horizontally. It carries on its inner end a restoring claw 336 which grips over the rocker 324. Inside the rod 334 there is mounted a movable pin 338 by means of a pre-stressed spring 340, which is pressed against the rocker 324.

The rod 334 is firmly connected with the pull rod 342 of a hydraulic cylinder 334, which is rigidly fixed on to the toolholder 302. A spring 346 is arranged with pre-compression between a locknut 348 screwed on to the rod 342 and the slide casing 302 on the rod 334. A material feed 350, which is arranged coaxially in relation to the cavity 120, can be moved vertically in a guides on the machine frame which are not shown in the drawing. Also arranged coaxially with the cavity 120 is a mandrel 50 with a top 352, the mandrel 50 being fixed, for example, on a turntable.

A rail 354 is rigidly connected with the toolholder 302. A limit switch 356 can be adjusted vertically along a rod 358 fitted to run vertically along the machine frame. The rail 354 actuates the switch 356 when the toolholder 302 has reached a pre-determined vertical position.

At the commencement of an operation the parts take up the positions shown in FIG. 2. The toolholder 302 is located in its top end position. The split followers 306 are opened. The slide 310, which is located in its open end position, frees the passage for the material feed 350. As a result of the pre-compression of the spring 346, acting via the locknut 348, the rod 334, the restoring claw 336, the rocker 324 and the groove block 318, the punching die 316 is held so far up that its bottom end is withdrawn completely into the insert 314. The material feed 350 is now pushed so far downwards by means not shown in the drawing until the material outlet aperture 360 provided in its bottom end leads into the interior of the cavity 120 (FIG. 1). The quantity of molten plastic, for example polyethylene, ejected from the material outlet aperture 360 in this position, is stripped off by the material feed in the cavity 120 when the material feed is drawn back and it forms a ring-shaped blank 362. At the same time as the withdrawal of the material feed 350 the toolholder 302 is moved downwards by means which are not shown in the drawing.

During the course of this downwards movement first of all the split followers 306 are pushed together so that the threaded hole 308 formed by them is located concentrically over the cavity aperture. After this the slide is pushed on to it with the help of the hydraulic cylinder 344 in the toolholder 302 until it comes to rest on the surface 364. When this happens the hydraulic cylinder 344 transmits its force first of all not to the rod 334 but via the locknut 348 and the spring 346 to the slide casing 312, the pre-compression of the spring 346 being sufficient to overcome the friction between the slide 310 and the toolholder 302 without any further spring action. After the slide casing 312 has come to rest on the surface 364 of the toolholder 302, the hydraulic cylinder 344 proceeds further and when this happens, whilst the spring 346 is now compressed between the locknut 348 and the slide casing 312, the rod 334 is pushed in the bearing block 330. Via the spring 340 and the pin 338 the rocker 324 is now swivelled, which in turn pushes the groove block 318 and the punching die 316 downwards into their lower end position so that the latter projects out of the insert 314. As can be seen from FIG. 3, the slide movement described above ends before the downwards movement of the toolholder 302 has brought the cavity 120 together with the top part of the mandrel 352.

It is now important that the punching die 316 in its bottom end position should not merely project by the dimension of the thickness of the material desired on the finished tube head, but by a multiple of this (FIG. 3). The punching die 316 and the upper part of the mandrel 352 then form a cohesive whole already at the beginning of the actual moulding process itself.

In this way one avoids that the material which is flowing during the pressing can get pushed between the punching die 316 and the upper part of the mandrel, which would make it impossible to produce a continuous aperture free from burr.

During the further course of the downwards movement of the toolholder 302 the cavity 120 is now pushed over the upper part of the mandrel 352. A prefabricated collapsible tube section 26 had previously been placed on the mandrel 50. During the course of the moulding process which now begins the punching die 316, which is already on the upper part of the mandrel 352, is pushed back against the action of the spring 340 once again partly into the interior of the slide casing 312.

The necessary counter-force is applied by the spring 340 via the pin 338, the rocker 324 and the grooved block 13. The downwards movement of the toolholder 302 is still continued until the latter has reached its terminal position (FIG. 4), and the tube head 30 has the desired shoulder thickness S (FIG. 6). As a result of the pressure 30 and the heat contained in the blank 362 the resultant tube head 30 is simultaneously welded with the tube body 26. As can be seen from FIG. 5, the insert 314 can have an annular groove 315 on its underside, which produces a sealing rib 36 on the end 32 of the tube head throat section 34.

After a short cooling period, in which the parts remain in the position shown in FIG. 4, first of all the split followers 306 are pushed apart so as to release the thread 40. After this the toolholder 302 is moved back vertically upwards. The rail 354 and the switch 356 make it impossible for the slide 310 to be drawn back into its initial position before the toolholder has been lifted by a considerable amount from the mandrel, thus avoiding any damage to the sealing rib 36. When the rail 354 has released the switch 356, the latter can now bring about the operation of the hydraulic cylinder 344 in the direction of withdrawing the plunger 342. When this is done first of all the rocker 324 is swivelled into the position shown in FIG. 1, until the retaining claw 336 rests on the bush 332; the punching die is thus pulled back completely into the slide 312 before the latter is now moved back out of the closure position.

Except where otherwise stated in the above explanations, the control of the hydraulic cylinder 344 and also of the means for operating the toolholder 302, the material feed 350 and the split followers 306, which can also consist of hydraulic cylinders or suitable pneumatically operated units, is carried out via solenoid valves from a joint control drum which opens or closes in a pre-determined order of sequence and timing electric circuits belonging to the switches.

It should also be mentioned that the insert 314 which together with the grooves 322 guides the punching die or its pin 320, can easily be exchanged together with the punching die.

By changing the insert 314 and the punching die 316 it is possible to vary as desired the diameter of the aperture 38 produced by the punching die.

It is also possible, for example, to produce a whole number of small apertures in the end surface 32 of the tube head 30.

In this case the insert 314 is provided with the desired number of holes in the desired arrangement. The corresponding number of punching dies is inserted in the groove block 318.

What is claimed is:

1. A device for closing a mould cavity having an aperture leading into the hollow space of the cavity, said device comprising at least one mandrel which can be introduced into the hollow space of the cavity from the opposite side of the aperture, a slide allocated to the mould cavity and capable of being moved at right angles to the mandrel and which in one terminal position blocks off the aperture into the hollow space of the cavity, a punching die which passes through the aperture when the hollow space of the cavity is closed, said punching die being arranged on the side of the slide in relation to the mould cavity and movable both transversely and parallel in relation to the longitudinal axis of the mandrel.

2. A device as in claim 1 including an axially movable member for introducing plastic into the hollow space of the cavity, said member being movable into the cavity through said aperture, said punching die being mounted in the slide so that it can move axially and can be moved with the slide at right angles to the axis of the punching die.

3. A device as in claim 2 including a joint actuating member connected with the slide and the punching die.

4. A device as in claim 3 wherein said joint actuating member includes retaining means connected between the punching die and the slide for imparting movement to the punching die relative to the slide in response to the arrival of the slide at its closed position.

5. A device as in claim 3 wherein the slide has an exchangeable annular insert which surrounds the punching die and blocks off the aperture when the slide is in the closed position.

6. A device as in claim 4 wherein the punching die has a rocker engaging with it which is mounted in the slide so as to swivel, and wherein an operating cylinder is operatively connected with the rocker.

7. A device as in claim 6 wherein the operating cylinder has a plunger which engages with the slide via a compression spring and which is connected with the rocker via a further compression spring and also the retaining means.

8. In apparatus for welding a head to a tubular body to produce a thermoplastic container, said apparatus being of the type including a mandrel having a shouldered head end, said tubular body being disposable on said mandrel with one end adjacent said shouldered head end of said mandrel, a female mold having a cavity defined by a shoulder forming section which is axially aligned with said mandrel, said shoulder forming section having an aperture axially aligned with said mandrel, means extendable and retractable through said aperture in said mold for ejecting into the mold cavity a quantity of thermoplastic material which is stripped off when the ejecting means is withdrawn, and means for moving said mandrel and mold relatively toward each other to cause the scraped-off quantity of thermoplastic material to come in contact with said one end of the tubular body and be welded thereto as a head for the tubular body, the improvement comprising a slide mounted for movement at right angles to said mandrel and having one terminal position in which it blocks off said aperture in said mold, and a punching die which passes through said aperture when said aperture is blocked by said slide, said punching die being movable both transversely of and parallel to the longitudinal axis of said mandrel.

9. Apparatus as in claim 8 wherein said punching die is mounted in said slide so that it can move axially and can be moved with the slide at right angles to the axis of the punching die.

10. Apparatus as in claim 9 including a joint actuating member connected with the slide and the punching die.

11. Apparatus as in claim 10 wherein said joint actuating member includes retaining means connected between the punching die and the slide for imparting movement to the punching die relative to the slide in response to the arrival of the slide at said one terminal position.

12. Apparatus as in claim 10 wherein the slide has an exchangeable annular insert which surrounds the punching die and blocks off said aperture when the slide is at said one terminal position.

13. Apparatus as in claim 11 wherein the punching die has a rocker engaging with it which is mounted in the slide so as to swivel, and wherein an operating cylinder is operatively connected with the rocker.

14. Apparatus as in claim 13 wherein the operating cylinder has a plunger which engages with the slide via a compression spring and which is connected with the rocker via a further compression spring and also with said retaining means.

15. In a device for molding a head on to a container blank, a cavity member defining a molding cavity and an aperture leading into said cavity, said aperture having an inside end and an outside end, a mandrel insertable into said cavity member towards the inside end of said aperture for introducing a portion of said container blank into said molding cavity, said mandrel comprising a front end, material feed means insertable and withdrawable from said molding cavity through said aperture for feeding molding material into said molding cavity and closure means for sealingly closing said aperture at the outside end thereof when said material feed means is in withdrawn position, said closure means comprising a punching die movable parallel to the longitudinal axis of said mandrel and through said aperture for cooperation with the front end of the mandrel when said closure means are in closing position.

16. A device as in claim 15 wherein said closure means further includes a slide movable at right angles to said mandrel, said die being mounted in said slide so that it can move axially and can be moved with the slide at right angles to the axis of the punching die.

17. A device as in claim 16 including a joint actuating member connected with the slide and the punching die.

18. A device as in claim 17 wherein said joint actuating member includes retaining means connected between the punching die and the slide for imparting movement to the punching die relative to the slide in response to the arrival of the slide at said one terminal position.

19. A device as in claim 17 wherein the slide has an exchangeable annular insert which surrounds the punching die and blocks off said aperture when the slide is at said one terminal position.

20. A device as in claim 18 wherein the punching die has a rocker engaging with it which is mounted in the slide so as to swivel, and wherein an operating cylinder is operatively connected with the rocker.

21. A device as in claim 20 wherein the operating cylinder has a plunger which engages with the slide via a compression spring and which is connected with the rocker via a further compression spring and also with said retaining means.

* * * * *